(12) United States Patent
Manula et al.

(10) Patent No.: US 9,069,705 B2
(45) Date of Patent: Jun. 30, 2015

(54) CAM BIT ERROR RECOVERY

(71) Applicant: Oracle International Corporation, Redwood City, CA (US)

(72) Inventors: Brian Edward Manula, Oslo (NO); Morten Schanke, Oslo (NO); Robert W. Wittosch, Duluth, GA (US)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 13/777,546

(22) Filed: Feb. 26, 2013

(65) Prior Publication Data

US 2014/0245092 A1  Aug. 28, 2014

(51) Int. Cl.
G11C 29/00 (2006.01)
G06F 11/14 (2006.01)

(52) U.S. Cl.
CPC .................................. *G06F 11/1412* (2013.01)

(58) Field of Classification Search
CPC ................................................ G06F 11/1412
USPC .............................. 714/763; 711/108; 365/49
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,728,123 B2 * | 4/2004 | Batson et al. | 365/49.18 |
| 6,741,253 B2 * | 5/2004 | Radke et al. | 345/531 |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,304,875 B1 * | 12/2007 | Lien et al. | 365/49.1 |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 2001/0036185 A1 | 11/2001 | Dempo | |
| 2003/0101158 A1 | 5/2003 | Pinto et al. | |
| 2005/0018669 A1 | 1/2005 | Arndt et al. | |
| 2005/0060443 A1 | 3/2005 | Rosner | |
| 2005/0135419 A1 | 6/2005 | Pullen et al. | |
| 2005/0223118 A1 | 10/2005 | Tucker et al. | |
| 2007/0008886 A1 | 1/2007 | Chen et al. | |
| 2007/0019665 A1 | 1/2007 | Benveniste | |

(Continued)

*Primary Examiner* — Sam Rizk
(74) *Attorney, Agent, or Firm* — Osha Liang LLP

(57) ABSTRACT

A method for content addressable memory (CAM) error recovery that includes detecting an error in an entry of a CAM, identifying an address of the entry in the CAM, copying data from the address in the backup random access memory (RAM) into the entry of the CAM to obtain a corrected CAM, clearing a results (first in first out) FIFO structure based on detecting the error, performing, using the corrected CAM, a match request stored in a replay FIFO structure to obtain a revised result, and storing the revised result in the results FIFO structure.

20 Claims, 5 Drawing Sheets

(56) References Cited

U.S. PATENT DOCUMENTS

| | | |
|---|---|---|
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |

* cited by examiner

| Time | Action | CAM | Backup RAM | Replay FIFO structure | Results FIFO Structure |
|---|---|---|---|---|---|
| t0 | Initial System | A0 QP1<br>A1 QP3<br>A2 QP2<br>A3 QP8<br>A4 QP5 | A0 QP1<br>A1 QP3<br>A2 QP2<br>A3 QP8<br>A4 QP5 | | |
| t1 | CAM update: A3, QP6 | A0 QP1<br>A1 QP3<br>A2 QP2<br>A3 QP6<br>A4 QP5 | A0 QP1<br>A1 QP3<br>A2 QP2<br>A3 QP6<br>A4 QP5 | | |
| t2 | Match Request: QP2 | A0 QP1<br>A1 QP3<br>A2 QP2<br>A3 QP6<br>A4 QP5 | A0 QP1<br>A1 QP3<br>A2 QP2<br>A3 QP6<br>A4 QP5 | QP2 | A2 |
| t3 | Match Request: QP5 | A0 QP1<br>A1 QP3<br>A2 QP2<br>A3 QP6<br>A4 QP5 | A0 QP1<br>A1 QP3<br>A2 QP2<br>A3 QP6<br>A4 QP5 | QP2<br>QP5 | A2<br>A4 |
| t4 | Match Request: QP1 | A0 QP1<br>A1 QP3<br>A2 QP2<br>A3 QP6<br>A4 QP5 | A0 QP1<br>A1 QP3<br>A2 QP2<br>A3 QP6<br>A4 QP5 | QP2<br>QP5<br>QP1 | A2<br>A4<br>A0 |
| t5 | Return result and Match Request: QP6 | A0 QP1<br>A1 QP3<br>A2 QP2<br>A3 QP9<br>A4 QP5 | A0 QP1<br>A1 QP3<br>A2 QP2<br>A3 QP6<br>A4 QP5 | QP5<br>QP1<br>QP6 | A4<br>A0<br>Not found |
| t6 | Error Detected at A3 | A0 QP1<br>A1 QP3<br>A2 QP2<br>A3<br>A4 QP5 | A0 QP1<br>A1 QP3<br>A2 QP2<br>A3 QP6<br>A4 QP5 | QP5<br>QP1<br>QP6 | |
| t7 | Copy and Replay Match Requests | A0 QP1<br>A1 QP3<br>A2 QP2<br>A3 QP6<br>A4 QP5 | A0 QP1<br>A1 QP3<br>A2 QP2<br>A3 QP6<br>A4 QP5 | QP5<br>QP1<br>QP6 | A4<br>A0<br>A3 |

FIG. 5B

CAM BIT ERROR RECOVERY

CROSS-REFERENCE TO RELATED APPLICATIONS

The present application contains subject matter that may be related to the subject matter in the following U.S. patent applications, which are assigned to a common assignee and are both incorporated by reference in their entirety: U.S. patent application Ser. No. 13/149,483, entitled "METHOD AND SYSTEM FOR TEMPORARY DATA UNIT STORAGE ON INFINIBAND® HOST CHANNEL ADAPTOR" and U.S. patent application Ser. No. 13/721,671, entitled "DISTRIBUTED QUEUE PAIR STATE ON A HOST CHANNEL ADAPTER."

BACKGROUND

In general, a computing device includes hardware and software or firmware. The hardware includes functionality to execute instructions of the software. Specifically, the hardware of the computer system includes functionality to perform operations specified by the software or firmware. Various types of hardware components exist. One type of hardware component is memory.

Different types of memory structures exist. A first type of memory structure receives an address, identifies the location in memory based on the address, and returns data located in the location in memory. Examples of the first type of memory include random access memory (RAM) or read only memory (ROM). A second type of memory structure is content addressable memory (CAM). A CAM is memory that receives data, compares the data to each entry in the CAM, and responds with an address in which the data is located. Thus, in contrast to a RAM or ROM that receives an address as input and produces data as output, a CAM receives data as input and responds with an address as output. Because of the number of comparisons to perform to identify the address, the total storage space for a CAM is typically on orders of magnitude much smaller than the total storage space for a RAM.

SUMMARY

In general, in one aspect, the invention relates to a method for content addressable memory (CAM) error recovery. The method includes detecting an error in an entry of a CAM, identifying an address of the entry in the CAM, copying data from the address in the backup random access memory (RAM) into the entry of the CAM to obtain a corrected CAM, clearing a results (first in first out) FIFO structure based on detecting the error, performing, using the corrected CAM, a match request stored in a replay FIFO structure to obtain a revised result, and storing the revised result in the results FIFO structure.

In general, in one aspect, the invention relates to a content addressable memory (CAM) system for error recovery. The CAM system includes a CAM including entries for storing data, a backup random access memory (RAM) operatively connected to the CAM, and for storing a copy of data stored in the entries of the CAM, a replay first in first out (FIFO) structure operatively connected to the CAM, and for storing match requests, a results FIFO structure operatively connected to the CAM, and for storing results of the match requests, and a master state machine operatively connected to the CAM, the results FIFO structure, the replay FIFO structure, and the backup RAM. The master state machine is configured to receive notification of an error in an entry of the CAM, initiate copying of data from the backup RAM into the entry of the CAM to obtain a corrected CAM, clear the results FIFO structure based on detecting the error, and initiate performing, using the corrected CAM and the replay FIFO structure, a match request in the replay FIFO structure.

In general, in one aspect, the invention relates to a chip that includes a content addressable memory (CAM) including entries for storing data, a backup random access memory (RAM) physically connected to the CAM, and for storing a copy of data stored in the entries of the CAM, a replay first in first out (FIFO) structure physically connected to the CAM, and for storing match requests, a results FIFO structure physically connected to the CAM, and for storing results of the match requests, and a master state machine physically connected to the CAM, the results FIFO structure, the replay FIFO structure, and the backup RAM. The master state machine is configured to receive notification of an error in an entry of the CAM, initiate copying of data from the backup RAM into the entry of the CAM to obtain a corrected CAM, clear the results FIFO structure based on detecting the error, and initiate performing, using the corrected CAM and the replay FIFO structure, a match request.

Other aspects of the invention will be apparent from the following description and the appended claims.

BRIEF DESCRIPTION OF DRAWINGS

FIGS. 5A-5B show an example in one or more embodiments of the invention.

DETAILED DESCRIPTION

Figure 1:
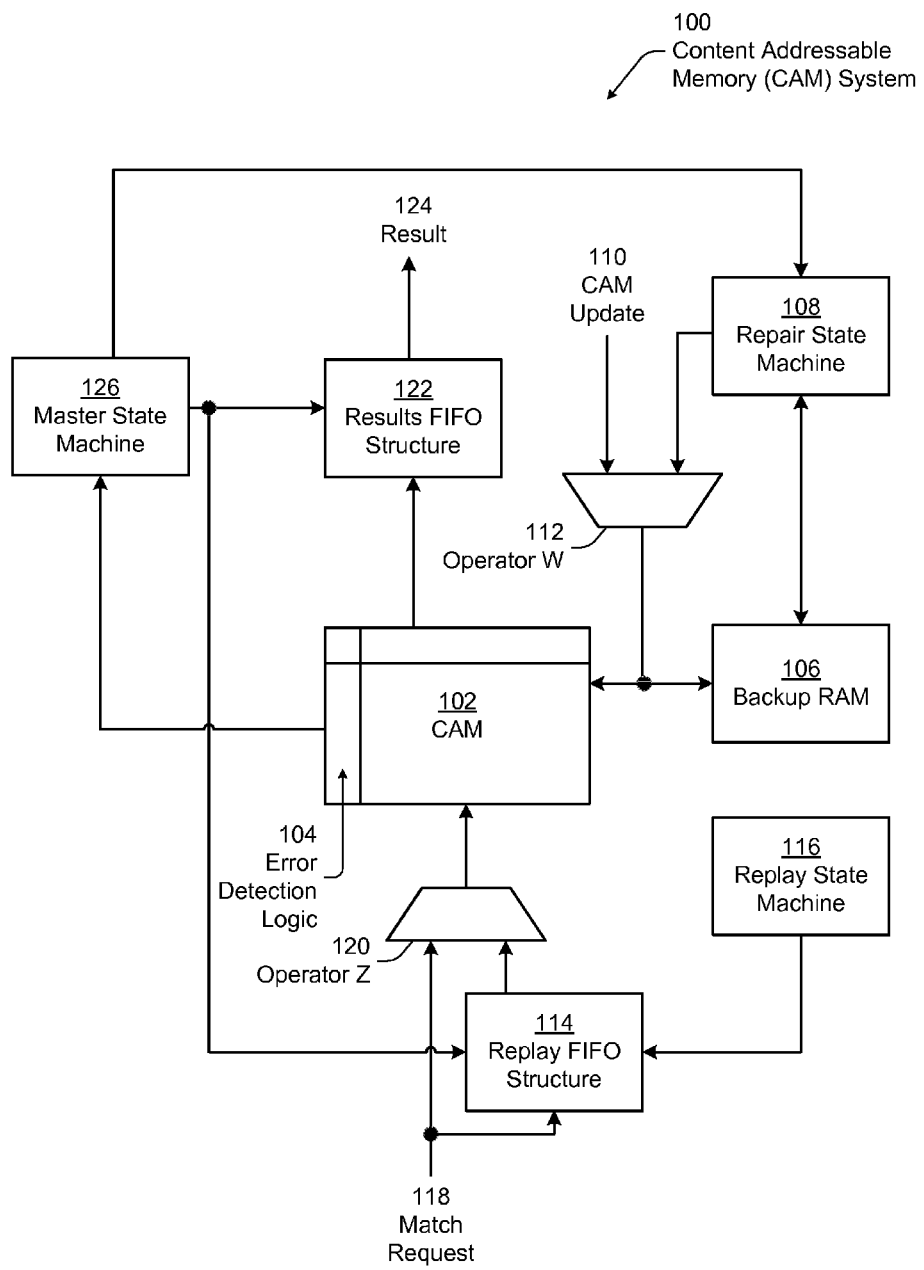
FIG. 1 shows a schematic diagram of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for content addressable memory (CAM) error recovery. Specifically, embodiments of the invention store, in a backup random access memory (RAM), a copy of data stored in the CAM. Embodiments further include a replay first in first out (FIFO) structure for storing requests to a CAM and a results FIFO structure for temporarily storing results. When error is detected, the results FIFO structure is cleared. Thus, components requesting the address do not receive incorrect results, such as incorrect addresses, incorrect misses on match requests, incorrect hits on match requests. Further, during the correction process, original, correct data is copied from the backup RAM into the CAM. Requests stored in the replay FIFO structure are re-performed and the results are stored in the results FIFO structure. Each entry of the results FIFO structure stores the matching address output, or result, from the CAM for a corresponding match request.

FIG. 1 shows a schematic diagram of a CAM system (100) in one or more embodiments of the invention. The CAM system (100) shown in FIG. 1 corresponds to hardware in one or more embodiments of the invention. Specifically, the components of the CAM system correspond to hardware components in one or more embodiments of the invention. Alternatively, one or more components of the CAM system may be implemented in whole or in part in firmware. Further, the CAM system may be stored on an integrated circuit board. For example, the components of the CAM system (100) may be on a single chip or span more than one chip. The connections between the components of FIG. 1 represent communicative connections. Specifically, connections show which components may communicate in one or more embodiments of the invention. Different physical connections may be used without departing from the scope of the claims. Further, the schematic diagram of FIG. 1 may represent an actual hardware layout or represent only a logical diagram.

As shown in FIG. 1, the CAM system (100) includes one or more of the following components: a CAM (102) with error detection logic (104), backup RAM (106), repair state machine (108), replay FIFO structure (114), replay state machine (116), results FIFO structure (122), master state machine (126), and operators (e.g., operator W (112), operator Z (120)). Each of these components is discussed below.

A CAM (102) corresponds to hardware that includes functionality to store data, receive a match request (118) as input, and respond with a result (124). In one or more embodiments of the invention, the match request (118) is a request to obtain the address of data if the data is stored in the CAM (102). The match request (118) includes the data in one or more embodiments of the invention. The result (124) is the address of the data in the CAM (102) or a no entry found notification when the data is not stored in the CAM (102).

The CAM (102) includes multiple entries in one or more embodiments of the invention. Each entry corresponds to a memory block that includes functionality to store data. Each entry in the CAM (102) has corresponding comparison logic for the particular entry. In other words, a one-to-one relationship exists between entries in the CAM (102) and comparison logic in one or more embodiments of the invention. The comparison logic includes functionality to determine whether stored data in the corresponding entry matches the requested data in the match request (118).

In one or more embodiments of the invention, the CAM (102) further includes error detection logic (104). The error detection logic (104) includes functionality to detect errors in stored data on the CAM (102). Specifically, the error detection logic (104) includes functionality to detect whether one or more bits have erroneously changed in the stored data. In one or more embodiments of the invention, separate error detection logic exists for each entry in the CAM (102). In one or more embodiments of the invention, the error detection logic (104) operates independently of the comparison logic for the corresponding entry. For example, while the comparison logic may operate at a first rate for processing match requests, the error detection logic (104) operates at a second rate for determining whether an error exists, where the first and second rates may be different.

In one or more embodiments of the invention, the error detection logic (104) is based on one or more parity bits. In such a scenario, the error detection logic (104) includes at least one parity bit and parity logic for each entry in the CAM (102). In particular, in one or more embodiments of the invention, a one-to-one relationship exists between the at least one parity bit and the parity logic and the entry in the CAM (102). The parity logic includes functionality to detect using the at least one parity bit whether an error exists in the stored data of the corresponding entry and output an error notification when an error exists. The parity logic may be based on single-bit exclusive or (XOR), multiple-bit XOR, and or other error codes. Further, although the above presents the error detection logic as being based on parity, other error detection logic may be used without departing from the scope of the invention.

In one or more embodiments of the invention, a backup RAM (106) is operatively connected to the CAM (102). The backup RAM (106) corresponds to memory that includes functionality to store copies of data currently stored in the CAM (102). Specifically, each entry in the CAM (102) has a corresponding entry in the backup RAM (106). The corresponding entry in the backup RAM (106) includes a copy of the data in the entry of the CAM (102). In one or more embodiments of the invention, the corresponding entries in the CAM (102) and the backup RAM (106) are identically addressed. In other words, when data is stored in an entry specified by an address of the CAM, a copy of the data is stored in an entry specified by the same address of the backup RAM.

In one or more embodiments of the invention, the CAM (102) and the backup RAM (106) both include functionality to receive and process a CAM update (110). The CAM update (110) includes the data to store and the address of the entry in which to store the data.

In one or more embodiments of the invention, a repair state machine (108) includes functionality to transition between operational mode and recovery mode and notify the backup RAM (106) accordingly. In operational mode, the backup RAM receives copies of data stored in the CAM (102). In recovery mode, copies of the data in backup RAM (106) are stored in the CAM (102). In one or more embodiments of the invention, the copies of the data may be stored directly or indirectly. As an example of indirect storage, the repair state machine (108) may include functionality to obtain the copies of data from the backup RAM (106) and populate the CAM (102) with the copies.

In one or more embodiments of the invention, operator W (112) may be interposed between the inputs of the CAM update (110) and repair state machine (108) and outputs to the backup RAM (106) and the CAM (102). For example, operator W (112) may be one or more gates, one or more switches, or any other hardware logic for controlling which inputs are used for which outputs.

Continuing with FIG. 1, a replay FIFO structure (114) is a hardware data structure for temporarily storing match requests (118) received by the CAM system (100). In one or more embodiments of the invention, the replay FIFO structure (114) includes multiple entries. Each entry includes functionality to store a match request. The number of entries in the replay FIFO structure (114) is dependent on the length of time required to detect an error in the CAM (102) and receive a replay notification to replay match requests by the replay FIFO structure (114), and the rate at which match requests are processed, in one or more embodiments of the invention. Specifically, the replay FIFO structure (114) includes a sufficient number of entries to store match requests received between the time an error is created and a replay notification is received.

In one or more embodiments of the invention, the replay FIFO structure (114) stores match requests in first in first out order. In other words, the first match request received that is currently stored in the replay FIFO structure (114) is the first match request that is discarded or transmitted as output in one or more embodiments of the invention. Any type of data structure may be used to implement the replay FIFO structure (114) without departing from the scope of the claims. For example, the replay FIFO structure (114) may be implemented as a ring buffer in one or more embodiments of the invention.

The replay state machine (116) includes functionality to transition between an operational mode and a recovery mode and to notify the replay FIFO structure accordingly. In the operational mode, incoming match requests are received from a requesting module, copies are stored in the replay FIFO structure, and the copies are discarded when the result is passed to the requesting module. In the recovery mode, copies of the match request are passed to the CAM structure to re-perform the match requests.

In one or more embodiments of the invention, operator Z (120) may be interposed between the inputs of the match request (118) and replay FIFO structure (114) and output to the CAM (102). For example, operator Z (120) may be one or more gates, one or more switches, or any other hardware logic for controlling which inputs are used for which outputs.

Continuing with FIG. 1, the results FIFO structure (122) is a hardware data structure for temporarily storing results (124). In one or more embodiments of the invention, the results FIFO structure (122) includes multiple entries. Each entry includes functionality to store a result. The number of entries in the results FIFO structure (122) is dependent on the length of time required to detect an error in the CAM (102) and receive a clear notification to clear results in the results FIFO structure (122), and the rate in which match requests are processed, in one or more embodiments of the invention. Specifically, the results FIFO structure (122) includes a sufficient number of entries to store results received between the time an error is created and clear notification is received.

In one or more embodiments of the invention, the results FIFO structure (122) stores results in first in first out order. In other words, the first result received that is currently stored in the results FIFO structure (122) is the first result that is discarded or transmitted as output in one or more embodiments of the invention. Any type of data structure may be used to implement the results FIFO structure (122) without departing from the scope of the claims. For example, the results FIFO structure (122) may be implemented as a ring buffer in one or more embodiments of the invention.

In one or more embodiments of the invention, the master state machine (126) includes functionality to receive an error notification from error detection logic (104) and transition the system to recovery mode based on the error notification. Specifically, the master state machine (126) may include functionality to directly cause the clearing of the results FIFO structure (122), the repairing of the CAM (102) using the backup RAM (106) and the replaying of the match requests by the replay FIFO structure (114). In one or more embodiments of the invention, the master state machine (126) includes functionality to self-transition between operational mode and recovery mode.

While FIG. 1 shows a configuration of components, other configurations may be used without departing from the scope of the invention. For example, various components may be combined to create a single component. As another example, the functionality performed by a single component may be performed by two or more components.

Figure 2:
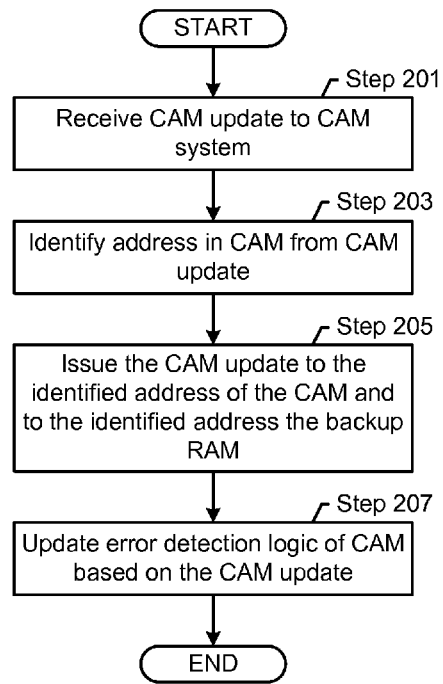
FIGS. 2-4 show flowcharts in one or more embodiments of the invention.
Figure 3:
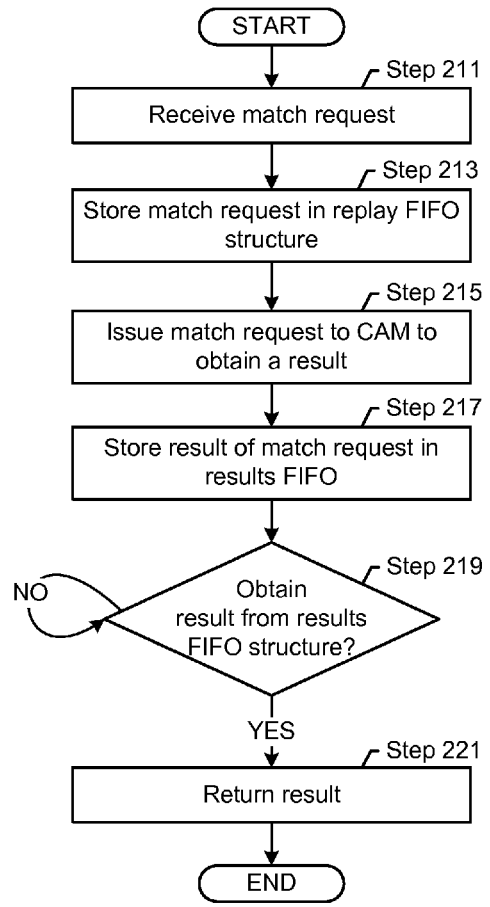
Figure 4:
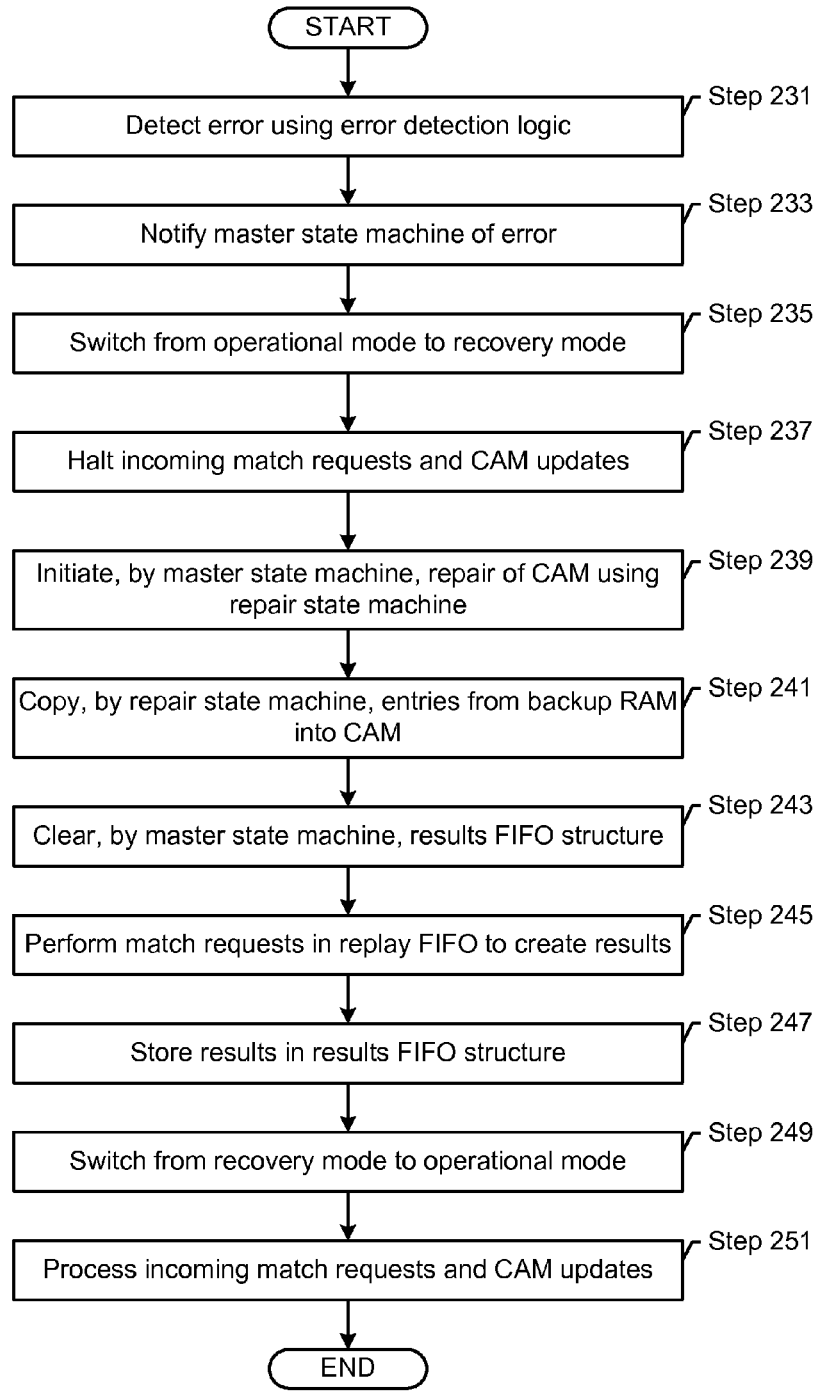

FIGS. 2-4 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for processing a CAM update in one or more embodiments of the invention. In Step 201, a CAM update to the CAM system is received. In one or more embodiments of the invention, a requesting module issues the CAM update to the CAM system. A requesting module is any hardware component or device that directly issues a request (e.g., match request, CAM update) to the CAM. For example, a requesting module may be a hardware component or device that uses the CAM to obtain the address corresponding to data. The CAM update may include an address in the CAM and data to store in the entry of the CAM specified by the address. In one or more embodiments of the invention, the CAM update may be to replace existing data in the entry with new data.

The CAM update may be received by the CAM and the backup RAM directly from the requesting module. In one or more embodiments of the invention, the CAM update is received by the CAM and the backup RAM based on the repair state machine being in operational mode. Specifically, the repair state machine may change the operator to a mode that accepts CAM updates and forwards the CAM updates to the CAM and the backup RAM. Alternatively, the CAM update may be received via the repair state machine.

In Step 203, an address in the CAM update is identified in one or more embodiments of the invention. Specifically, the address is extracted from the CAM update. In one or more embodiments of the invention, the address may be extracted by the CAM and the backup RAM and/or by the repair state machine.

In Step 205, the CAM update is issued to the identified address in both the CAM and the identified address in the backup RAM. Issuing the CAM update includes storing the data in the CAM update into the entry of the CAM and the entry of the backup RAM specified by the address. In one or more embodiments of the invention, an identical address is used to store the CAM update in the backup RAM and the CAM. Thus, data referenced by a particular address existing in the backup RAM is a copy of the data referenced by the particular address stored in the CAM, provided such data does not have errors in the CAM.

In Step 207, the error detection logic of the CAM is updated based on the CAM update. Various methods may be used for updating the error detection logic of data stored in an entry of the CAM without departing from the scope of the invention. For example, if parity is used, the parity may be calculated by performing an XOR operation of the bits in the data in the CAM update. In one or more embodiments of the invention, the CAM system updates the error detection logic. Alternatively or additionally, the update may be provided by the requesting module as part of the CAM update. In such a scenario, the requesting module may include functionality to calculate the update. In one or more embodiments of the invention, the update is stored with the updated data in the CAM.

FIG. 3 shows a flowchart for processing a match request in one or more embodiments of the invention. In Step 211, a match request is received in one or more embodiments of the invention. In particular, a requesting module issues the match request to the CAM system. The requesting module may be the same or different from the requesting module that issued the CAM update. In one or more embodiments of the invention, the match request includes the data requested to be matched.

In Step 213, the match request is stored in the replay FIFO structure in one or more embodiments of the invention. In one or more embodiments of the invention, the match request is stored in order in the replay FIFO structure. Thus, with each successive match request, the match request is added to the logical end of the replay FIFO structure.

In Step 215, the match request is issued to the CAM to obtain a result in one or more embodiments of the invention. When the match request is received by the CAM, comparison logic associated with each entry compares data in the match request with data in the corresponding entry. In one or more embodiments of the invention, the comparisons performed by the comparison logic for each entry is performed in parallel. The comparison logic corresponding to the entry having the matching data issues the address of the entry. The address is the result of the comparison. In one or more embodiments of the invention, if no matching entry is found, then the result indicates that a matching entry does not exist.

In Step 217, the result is stored in the results FIFO in one or more embodiments of the invention. Similar to the replay FIFO structure, results are stored in order, such that the last result created by the CAM is at the logical end of the results FIFO structure.

In Step 219, a determination is made as to whether to obtain the result from the results FIFO structure in one or more embodiments of the invention. Specifically, in one or more embodiments of the invention, the result is not issued immediately to the requesting module. Rather, the process waits a period of time to issue the result. The period of time is sufficient to allow for the error to be created just prior to the match request being issued, the error to be detected by the CAM, and the results FIFO structure to be cleared.

Determining whether to obtain the result may be performed, for example, based on whether the result is the next result in the results FIFO structure, based on a timer measuring a length of time that the result is in the results FIFO structure, and/or other logic. For example, the size of the results FIFO structure may be set such that when the result is the next result to be returned, the error detection period of time as measured by the timer has elapsed. By way of another example, the results FIFO structure may store a logical time for each corresponding result. The logical time may indicate when the corresponding result is added to the results FIFO structure or when to remove the corresponding result from the results FIFO structure. In one or more embodiments of the invention, by comparing the logical time with a clock, the determination may be made whether the period of time has elapsed and the result is to be returned to the requesting module.

In Step 221, if a determination is made to return the result, then the result is returned. In one or more embodiments of the invention, when the result is returned, the match request corresponding to the result is removed from the replay FIFO structure. Removing the match request may be performed independently of returning the result or triggered by the returning of the result. For example, both the result FIFO structure and the replay FIFO structure may perform independent determinations of when to return the result and remove the match request, respectively. The independent determinations may be based, for example, on the period of time. The replay FIFO structure may perform the determination similar to the results FIFO structure performing the determination. Alternatively or additionally, the replay FIFO structure may receive a notification from the results FIFO structure when the result is returned. In response to the notification, the replay FIFO structure may remove the copy of the match request. If a determination is made not to return the result, then the result waits in the result queue.

Although FIG. 3 shows that the result either waits or is returned, the results queue may be cleared prior to the result being returned because of the detection of an error. In such a scenario, the result is not returned, but rather is cleared.

FIG. 4 shows a flowchart for error detection and recovery in one or more embodiments of the invention. In Step 231, an error is detected. In one or more embodiments of the invention, the error is detected by the error detection logic. In one or more embodiments of the invention, the error detection logic associated with each entry tests for error, in parallel. If parity is used, the parity logic for each entry calculates, in parallel, the parity for the data currently stored in the entry. In other words, the various parity logics, each corresponding to an entry of the CA, operate in parallel to each other. The parity logic further compares the parity with the stored parity. If the parities match, then no error is detected. If the parities do not match, then an error is detected.

In Step 233, the master state machine is notified of the error. Specifically, the CAM sends a signal to the master state machine indicating that an error has been detected. In one or more embodiments of the invention, the signal includes the address of the entry or entries having the error(s). Alternatively, in one or more embodiments of the invention, if multiple entries have an error, than the address of the first entry having the error is included in the signal.

In Step 235, the CAM system switches from operational mode to recovery mode. In one or more embodiments of the invention, the master state machine changes to recovery mode. In one or more embodiments of the invention, the switch to recovery mode triggers the master state machine to notify the repair state machine and the replay state machine to switch to recovery mode.

In Step 237, incoming match requests and CAM updates are halted. In one or more embodiments of the invention, the repair state machine and replay state machine may change the corresponding operators to not accept new CAM updates and match requests, respectively.

In Step 239, the master state machine initiates repair of the CAM using the repair state machine. In one or more embodiments of the invention, the notification to the repair state machine from the master state machine causes the repair state machine to start repairing the CAM using the copies of entries in the RAM.

In Step 241, the repair state machine copies entries from the backup RAM into the CAM to obtain a corrected CAM. For example, the notification from the master state machine includes the address or addresses in which the error is detected. In such embodiments, the repair state machine may initiate the backup RAM to return, to the CAM, the data in the backup RAM located at the particular address or addresses. Accordingly, correct data is copied to the CAM. In alternative embodiments, when only a single address is provided, the repair state machine may copy data starting at the single address and ending at the last address of the backup RAM. Alternatively, the entire backup RAM may be copied into the CAM whenever the system is in recovery mode without departing from the scope of the invention.

In Step 243, the master state machine clears the results FIFO structure. Specifically, results in the results FIFO structure may be deemed faulty. Clearing the results FIFO structure may include marking each entry in the results FIFO structure as available for storing new data and/or adjusting pointers, such that the next entry to be returned references the next entry to be added. As another example, clearing the results FIFO structure may include changing bit values in the results FIFO structure to indicate that the bits do not represent valid data.

In Step 245, match requests in the replay FIFO are performed to create results. Specifically, in one or more embodiments of the invention, each match request is performed in order in which the match request is stored. Performing the match requests may be performed as discussed above with reference to FIG. 3.

Continuing with FIG. 4, in Step 247, results are stored in the results FIFO structure. Specifically, the results are stored in order in the results FIFO structure. Once the results are stored, the results wait in the results FIFO structure to be returned to the requesting module(s) requesting the results. Determining when to return the results and returning the results may be performed as discussed above with reference to FIG. 3.

In Step 249 in FIG. 4, the CAM system switches from recovery mode to operational mode. In one or more embodiments of the invention, after the match requests are performed in the replay FIFO structure and the results stored, the master state machine switches to operational mode and notifies the repair state machine and replay state machine to switch to operational mode. The repair state machine and replay state machine transitions to operational mode.

In one or more embodiments of the invention, the transition causes the corresponding operators to allow incoming CAM updates and match requests. Thus, in Step 251, incoming match requests and CAM updates are processed in one or more embodiments of the invention. Processing incoming match requests and CAM updates may be performed as discussed above with reference to FIGS. 2 and 3.

The above CAM system may be implemented, for example, in the architecture described in U.S. patent application Ser. No. 13/149,483, entitled "METHOD AND SYSTEM FOR TEMPORARY DATA UNIT STORAGE ON INFINIBAND® HOST CHANNEL ADAPTOR." U.S. patent application Ser. No. 13/149,483 is incorporated herein by reference in its entirety. In the aforementioned architecture, the hardware linked list queue may be implemented as virtually any data structure. Further, the various indexes to list memory and list to index memory may be implemented using the CAM system presented above.

As another example, the CAM system may be implemented, for example, in the architecture described in U.S. patent application Ser. No. 13/721,671, entitled "DISTRIBUTED QUEUE PAIR STATE ON A HOST CHANNEL ADAPTER." U.S. patent application Ser. No. 13/721,671 is incorporated herein by reference in its entirety. In the architecture of U.S. patent application Ser. No. 13/721,671, the QP index table is implemented as the CAM structure discussed above.

Figure 5A:
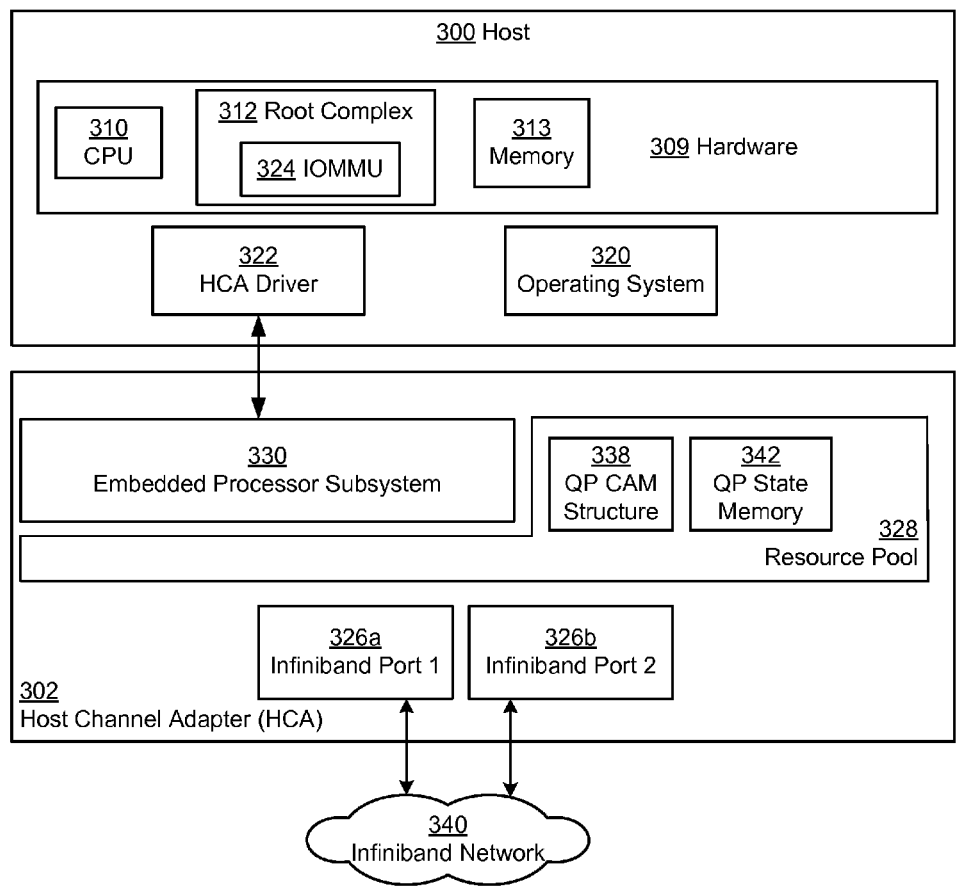

The following example is for explanatory purposes only and not intended to limit the scope of the invention. FIG. 5A shows an example host system in which the CAM system may be implemented in one or more embodiments of the invention. By way of an overview for the example, a communication system may include a transmitting system and a receiving system, each of which are any type of physical computing device connected to the Infiniband® network. By way of an example of the transmitting system and the receiving system, the transmitting system and/or a receiving system may be a host system, such as the host system described in FIG. 5A below. The host may be an application server, a storage server, any other type of computing device. In one or more embodiments of the invention, for a particular message, the transmitting system is a system that sends the message and the receiving system is a system that receives the message. In other words, the use of the words, "transmitting" and "receiving", refer to the roles of the respective systems for a particular message. The roles may be reversed for another message, such as a response sent from receiving system to transmitting system. For such a message, the receiving system becomes a transmitting system and the transmitting system becomes a receiving system. Thus, communication may be bi-directional in one or more embodiments of the invention. In one or more embodiments of the invention, one or more messages may include a work request. A work request is a request to perform an action.

The work request may be directed to an application or a host channel adapter (HCA) (discussed below) that is interposed between the device executing the application and the network. Specifically, the transmitting system and the receiving system include a requestor application and a responder application, respectively. The requestor application is a software application that sends the message and the responder application is a software application that receives the message. When the requestor application initiates a send of the message or performs a configuration of the HCA or network, the requestor application issues a command to the HCA. The command is a work request. When the requestor application issues a message, which may or may not be an RDMA read or RDMA write, to the responder application, the message is the work request. For example, the message may explicitly or implicitly indicate an action for the responder application to perform.

Requestor application and responder application communicate using queue pairs (QPs). Specifically, a queue pair (QP) defines communication channels between the requestor application and the responder application. More specifically, per the Infiniband® protocol, the message has a corresponding send queue and a corresponding receive queue. An application uses the send queue to send messages and the receive queue to receive messages. The send queue and receive queue on the same host that is used by the application to communicate with another application form a QP. Each QP may have a corresponding QP with which to communicate. For example, consider the scenario where application M is communicating with application N. In such a scenario, application M may have QP M, with send queue M and receive queue M, and application N may have QP N, with send queue N and receive queue N. Messages from application M to application N are sent from send queue M to receive queue N. Messages from application N to application M are sent from send queue N to receive queue M. Logic and data structures used by the host system specify which QP on the recipient to use to send messages. Thus, by the requestor application specifying the QP, the requestor application is identifying the responder application to receive the message.

FIG. 5A shows an example of the host system in one or more embodiments of the invention. Specifically, the host system (300) includes at least a minimum amount of hardware necessary to process instructions. As shown in FIG. 5A, the host system includes a host (300) and a host channel adapter (HCA) (302) in one or more embodiments of the invention. These components are discussed below.

In one or more embodiments of the invention, the host (300) includes an HCA driver (322) and operating system (320), and a root complex (312). In one or more embodiments of the invention, the HCA driver (322) is software that provides an interface to the HCA (302) for the operating system (320). Specifically, when the operating system (320) wants to send work requests to the HCA (302), the operating system (320) invokes a routine in the HCA driver (322).

Continuing with the host, the host (300) includes hardware (309). The hardware (309) may include, for example, a central processing unit (CPU) (310), memory (313), and a root complex (312). In one or more embodiments of the invention, the CPU (310) is a hardware processor component for processing instructions of the host. The CPU (310) may include multiple hardware processors. Alternatively or additionally, each hardware processor may include multiple processing cores in one or more embodiments of the invention. In general, the CPU (310) is any device configured to execute instructions on the host (300).

In one or more embodiments of the invention, the memory (313) is any type of hardware device for storage of data. In one or more embodiments of the invention, the memory (313) may be partitioned. In one or more embodiments of the invention, the memory (313) includes functionality to store a send queue (not shown). In one or more embodiments of the invention, a send queue includes functionality to store an ordered list of work request identifiers for work requests for processing by the host channel adapter (302). In one or more embodiments of the invention, the work request identifiers may be the actual work requests and/or references to the work requests stored in memory.

In one or more embodiments of the invention, the root complex (312) includes functionality to connect the CPU and memory subsystem to a peripheral component interconnect (PCI) Express switch fabric. Specifically, in one or more embodiments of the invention, the root complex (312) connects the host (300) to the host channel adapter (302). Although FIG. 5A shows the root complex (312) as separate from the CPU (310), the root complex (312) may be integrated as part of the CPU.

The root complex (312) includes an input/output memory management unit (IOMMU) (324) in one or more embodiments of the invention. The IOMMU (324) includes functionality to connect a direct memory access (DMA) input/output (I/O) bus to the memory. In one or more embodiments of the invention, the IOMMU (324) includes functionality to translate addresses from one level of abstraction to another.

Continuing with FIG. 5A, the host (300) is connected to the host channel adapter (302). In one or more embodiments of the invention, the connection between the host (300) and the host channel adapter (302) may be a PCI express connection. Specifically, the host channel adapter may connect to a PCI express fabric connector on the host.

In one or more embodiments of the invention, the host channel adapter (302) is a hardware device configured to connect the host (300) to the Infiniband® network (340). Specifically, the host channel adapter (302) includes functionality to receive work requests from the host (300) and process the work requests. Processing the work requests may include performing DMA with host memory to obtain and store packet data and to obtain control information, performing any validation required on the packet data, generating packets from the packet data, and sending and receiving packets on the Infiniband® network (340). FIG. 5A shows a schematic diagram of the host channel adapter (302) from the prospective of the host (300). As shown in FIG. 5A, the host channel adapter (302) includes at least one Infiniband® port (e.g., Infiniband® port 1 (326a), Infiniband® port 2 (326b)), a resource pool (328), and an embedded processor subsystem (330). Each of the components of the host channel adapter is discussed below.

In one or more embodiments of the invention, an Infiniband® port (e.g., Infiniband® port 1 (326a), Infiniband® port 2 (326b)) is a physical interface connector between the host channel adapter (302) and the Infiniband® network (340). Although FIG. 5A shows two Infiniband® ports, a different number of ports may exist without departing from the invention.

The resource pool (328) is a collection of resources that are required to send and receive packets on the Infiniband® network. Specifically, the resource pool (328) corresponds to the collection of hardware and stored data that is accessible by the host (300) and may be shared among virtual machines on the host (300).

In one or more embodiments of the invention, the resource pool (328) includes a QP state memory (342) and a QP CAM structure (338). The QP state memory (342) corresponds to memory that stores all or part of QP state information for one or more QPs. The QP state information may include, for example, sequence number, address of remote receive queue/send queue, whether the QP is allowed to send or allowed to receive, and other state information. The CAM structure (338) may be used to identify an address in the QP state memory storing the QP state information for a particular QP. Specifically, the data in the QP CAM structure may be a QP identifier and the result may be the address.

FIG. 5B shows an example timing chart for the QP CAM structure (338). In the example timing chart, top row (350) includes headers detailing each column of the chart. Specifically, the time column provides a relative time. The action column specifies an action performed during the time. The CAM column shows an example logical CAM diagram showing which QP identifier (designated by "QP" and a number) is stored in an entry corresponding to which address (designated by "A" and a number). The backup RAM column shows an example logical backup RAM diagram showing which QP identifier (designated by "QP" and a number) is stored in an entry corresponding to a particular address (designated by "A" and a number). The replay FIFO structure column shows what may be stored in the replay FIFO structure. The results FIFO structure column shows what may be stored in the results FIFO structure. Although the CAM and backup RAM each have only five entries, a different number of entries may exist without departing from the scope of the invention. Further, although the replay FIFO structure and results FIFO structure each have only three entries in the example, a different number of entries may exist without departing from the scope of the invention.

Continuing with the example, in the second row (352), an initial state of the system is shown at time t0. Specifically, in the entry corresponding to address A0, QP1 is stored in the CAM and backup RAM. In the entry corresponding t0 address A1, QP3 is stored in the CAM and backup RAM. In the entry corresponding to address A2, QP2 is stored in the CAM and backup RAM. In the entry corresponding to address A3, QP8 is stored in the CAM and backup RAM. In the entry corresponding to address A4, QP5 is stored in the CAM and backup RAM. Both the replay FIFO structure and the results FIFO structure are empty.

At time t1 shown in the third row (352), a CAM update is received to replace the entry at address A3 with data QP6. Accordingly, as shown in the third row (352), the CAM and the backup RAM are both updated such that the entry corresponding to address A3 includes QP6.

At time t2 shown in the fourth row (354), a match request is received to identify the address of the entry storing QP2. The match request is stored in the replay FIFO structure as shown in the fourth row. Further, QP2 is compared with data in each entry of the CAM to obtain the result of A2. A2 is stored in the results FIFO structure. Because the error detection period of time has not lapsed, A2 remains in the results FIFO structure. The error detection time period may be determined not to elapse by comparing a time value corresponding to the entry with a clock.

At time t3 shown in the fifth row (358), a match request is received to identify the address of the entry storing QP5. The match request is stored in the replay FIFO structure as shown in the fifth row. Further, QP5 is compared with data in each entry of the CAM to obtain the result of A4. A4 is stored in the results FIFO structure. Because the error detection period of time has not lapsed, A4 remains in the results FIFO structure.

At time t4 shown in the sixth row (360), a match request is received to identify the address of the entry storing QP1. The match request is stored in the replay FIFO structure as shown in the sixth row. Further, QP1 is compared with data in each entry of the CAM to obtain the result of A0. A0 is stored in the results FIFO structure. Because the error detection period of time has not lapsed, A0 remains in the results FIFO structure.

At time t5 shown in the seventh row (362), the time period has elapsed to return a result. Accordingly, as shown in the seventh row, A2 is returned to a requesting module and the replay FIFO structure and the results FIFO structure do not include QP2 or A2 respectively. Additionally, at time t5, a match request is received to identify the address of the entry storing QP6. The match request is stored in the replay FIFO structure as shown in the seventh row. Further, QP6 is compared with data in each entry of the CAM to obtain the result that no match exists. In particular, between the time t4 and t5, the bits changed causing an error in row A3. Accordingly, no match found is stored in the results FIFO structure. Because the error detection period of time has not lapsed, the result of no match found remains in the results FIFO structure.

At time t6 shown in the eighth row (364), an error is detected at A3. In one or more embodiments of the invention, the error is detected because the single bit parity for 9 is different from the single bit parity for 6. Parity logic detects that the parity of the stored data in the entry of the CAM does not match the stored parity associated with the entry. In response, the results FIFO structure is cleared and the entry at A3 is deemed to be incorrect.

At time t7 shown in the ninth row (366), the entry for A3 in the backup RAM is copied to the CAM. Thus, the CAM includes correct data for A3. Next, the match requests are replayed from the replay FIFO structure to obtain results. The results are stored in order in the results FIFO structure. Thus, in the example, the CAM system recovered from the error in the CAM and the correct result is obtained for QP6. After recovering from the error, the CAM system may continue processing match requests and CAM updates.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for content addressable memory (CAM) error recovery, comprising:
   detecting an error in an entry of a CAM;
   identifying an address of the entry in the CAM;
   copying data from the address in a backup random access memory (RAM) into the entry of the CAM to obtain a corrected CAM;
   clearing a results (first in first out) FIFO structure based on detecting the error;
   performing, using the corrected CAM, a match request stored in a replay FIFO structure to obtain a revised result; and
   storing the revised result in the results FIFO structure.

2. The method of claim 1, further comprising:
   receiving a CAM update;
   identifying the address in the CAM from the CAM update to obtain an identified address; and
   issuing the CAM update to the identified address in the CAM and the identified address in the backup RAM.

3. The method of claim 2, further comprising:
   updating a parity bit of the entry in the CAM based on issuing the CAM update, wherein the error is detected using the parity bit.

4. The method of claim 1, further comprising:
   receiving the match request;
   storing the received match request in the replay FIFO structure;
   issuing the match request to the CAM to obtain a result; and
   storing the result in the results FIFO structure.

5. The method of claim 4, wherein the result is cleared from the result FIFO before elapse of an error time.

6. The method of claim 1, wherein the match request is received from a requesting module, and further comprising:
   returning the revised result to the requesting module after an elapse of an error time.

7. The method of claim 6, wherein the error time is determined to elapse when the result is a next result to be returned from the result FIFO structure.

8. The method of claim 7, wherein a size of the result FIFO structure is calculated as a function of a first amount of time to detect the error in the CAM and clear the result FIFO structure, and a second amount of time to return an entry in the result FIFO structure.

9. The method of claim 1, further comprising:
   after detecting the error and prior to copying data from the backup RAM, switching to a recovery mode from an operational mode;
   halting incoming match requests and CAM updates based on being in the recovery mode; and
   after performing match requests in the replay FIFO structure, switching from the recovery mode to the operational mode.

10. The method of claim 1, further comprising:
    receiving a notification of the error by a master state machine; and
    initiating, by the master state machine, a repair of the CAM.

11. A content addressable memory (CAM) system for error recovery, comprising:
    a CAM comprising a plurality of entries for storing data;
    a backup random access memory (RAM) operatively connected to the CAM, and for storing a copy of data stored in the plurality of entries of the CAM;
    a replay first in first out (FIFO) structure operatively connected to the CAM, and for storing a plurality of match requests;
    a results FIFO structure operatively connected to the CAM, and for storing a plurality of results of the plurality of match requests; and
    a master state machine operatively connected to the CAM, the results FIFO structure, the replay FIFO structure, and the backup RAM, and configured to:
       receive notification of an error in an entry of the plurality of entries, initiate copying of data from the backup RAM into the entry of the CAM to obtain a corrected CAM, clear the results FIFO structure based on detecting the error, and initiate performing, using the corrected CAM and the replay FIFO structure, a match request of the plurality of match requests.

12. The CAM system of claim 11, wherein the backup RAM and CAM are configured to:

receive a CAM update; and store the CAM update in a location specified by an address in the CAM update.

13. The CAM system of claim 11, wherein the CAM comprises:

a parity block comprising, for each entry of the plurality of entries, a parity bit and parity logic, wherein the parity logic is configured to detect the error in the corresponding entry of the plurality of entries using the parity bit.

14. The CAM system of claim 11, wherein the replay FIFO structure is configured to:

receive a copy of each incoming match requests received by the CAM;

store the copy of each incoming match requests received by the CAM; and send, in order, the plurality of match requests stored in the replay FIFO structure to the CAM in response to notification from the master state machine.

15. The CAM system of claim 11, wherein the results FIFO is further configured to:

return the revised result to a requesting module after an elapse of an error time.

16. The CAM system of claim 11, wherein the master state machine comprises:

a mode bit for switching between operational mode and recovery mode, and wherein the master state machine is further configured to:

after receiving notification of the error and prior to initiating copying of the data from the address, switch the mode bit to the recovery mode;

halting incoming match requests and CAM updates based on being in the recovery mode; and match requests in the replay FIFO structure are performed, switch the mode bit to operational mode.

17. The CAM system of claim 11, further comprising:

a repair state machine operatively connected to the master state machine and configured to:

receive, from the master state machine, a notification to copy the data from the backup RAM; and perform the copying of the data from the backup RAM based on the notification.

18. A chip comprising:

a content addressable memory (CAM) comprising a plurality of entries for storing data;

a backup random access memory (RAM) physically connected to the CAM, and for storing a copy of data stored in the plurality of entries of the CAM;

a replay first in first out (FIFO) structure physically connected to the CAM, and for storing a plurality of match requests;

a results FIFO structure physically connected to the CAM, and for storing a plurality of results of the plurality of match requests; and a master state machine physically connected to the CAM, the results FIFO structure, the replay FIFO structure, and the backup RAM, and configured to:

receive notification of an error in an entry of the plurality of entries, initiate copying of data from the backup RAM into the entry of the CAM to obtain a corrected CAM, clear the results FIFO structure based on detecting the error, and initiate performing, using the corrected CAM and the replay FIFO structure, a match request of the plurality of match requests.

19. The chip of claim 18, wherein the CAM comprises:

a parity block comprising, for each entry of the plurality of entries, a parity bit and parity logic, wherein the parity logic is configured to detect the error in the corresponding entry of the plurality of entries using the parity bit.

20. The chip of claim 18, further comprising:

a repair state machine operatively connected to the master state machine and configured to:

receive, from the master state machine, a notification to copy the data from the backup RAM; and perform the copying of the data based on the notification.

* * * * *

UNITED STATES PATENT AND TRADEMARK OFFICE
CERTIFICATE OF CORRECTION

| | |
|---|---|
| PATENT NO. | : 9,069,705 B2 |
| APPLICATION NO. | : 13/777546 |
| DATED | : June 30, 2015 |
| INVENTOR(S) | : Manula et al. |

It is certified that error appears in the above-identified patent and that said Letters Patent is hereby corrected as shown below:

In the specification

Column 4, line 2, delete "and or" and insert -- and/or --, therefor.

Column 12, line 51, after "corresponding" delete "t0" and insert -- to --, therefor.

Signed and Sealed this
First Day of March, 2016

Michelle K. Lee
*Director of the United States Patent and Trademark Office*